Feb. 7, 1961    M. GARBUNY    2,971,093
COLOR THERMAL IMAGE SYSTEM
Filed Sept. 28, 1953

WITNESSES:
Robert C. Baird
Charles F. Renz

INVENTOR
Max Garbuny.
BY F. E. Browder
ATTORNEY

United States Patent Office 2,971,093
Patented Feb. 7, 1961

2,971,093
COLOR THERMAL IMAGE SYSTEM

Max Garbuny, Pittsburgh, Pa., assignor to Westinghouse Electric Corporation, East Pittsburgh, Pa., a corporation of Pennsylvania Filed Sept. 28, 1953, Ser. No. 383,149

11 Claims. (Cl. 250—83.3)

My invention relates to thermal image converter systems and more particularly to the presentation of the temperature as well as emissivity variation of observed objects by means of a color contrasting image.

Thermal image converters detect and translate a thermal image into a light image by virtue of differential radiation due either to differences in temperature or emissivity among the various objects of the observed scene.

There is shown in my copending application with John S. Talbot, Serial No. 304,502, filed August 15, 1952, assigned to the same assignee a suitable converter arrangement and is incorporated herein whereby a thermal image is detected by means of a photothermionic tube and presented on a viewing screen of a conventional kinescope for the viewer.

My invention refers mainly to those converters which reproduce the light image by means of a modulated electron beam such as a kinescope.

It is customary in the art of thermal image converters to depict the fluctuation in the amount of infrared radiation received from the scene without differentiating between the nature of their origin, that is, without giving information if such fluctuations are due to variation in temperature or in emissivity of the scene.

It is highly desirable, particularly from a military point of view, to distinguish between objects at elevated temperatures which signify human activity and a background of uniform temperature displaying details only by virtue of differential emissivities. For example, a body of elevated temperature but of low emissivity may emit the same amount of detectable radiation as a cold surface of high emissivity and, therefore, would be indistinguishable on the present devices.

In the medium infrared regions, 1 micron to 25 microns in wavelength, it is found that the emissivity factor in the total energy of radiation is nearly independent of the wavelength, while the temperature factor in the total energy of radiation is largely the determining factor in the spectral distribution of the total radiation energy.

Accordingly, it is an object of my invention to provide a device adding greater contrast to detected thermal images.

It is another object to provide a device for the representation of thermal images such that objects at an elevated temperature appear in relief against the background of objects of uniform temperature.

It is another object to provide a device for the presentation of a thermal image in color such that objects at an elevated temperature appear in a contrasting color to a background color of objects having a uniform temperature.

It is another object to provide a device capable of utilizing not only the total amount of radiation of an object but also its spectral distribution to provide a more detailed reproduction of the thermal image.

These and other objects are effected by my invention as will be apparent from the following description taken in accordance with the accompanying drawing in which.

Figure 3:
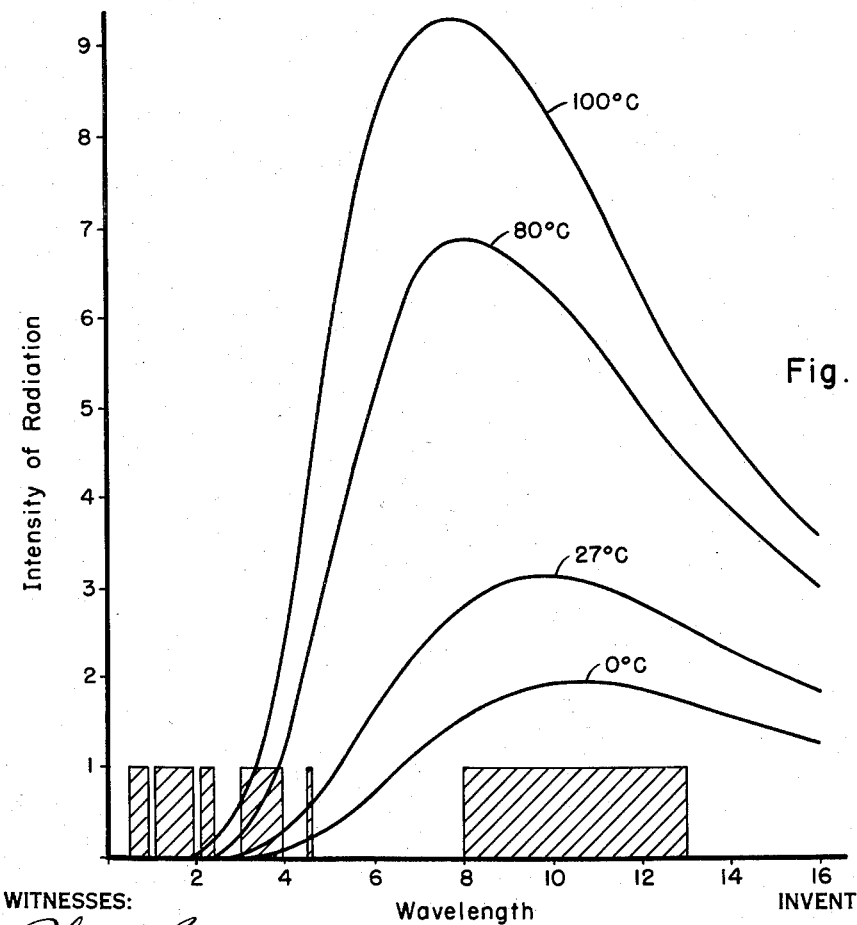
Fig. 3 is a set of explanatory curves.

Referring in detail to Fig. 3 there is shown a set of curves which displays the amount of emitted infrared radiation as a function of wavelength in microns from a gray or black surface at various temperatures. The shaded areas located on the abscissa indicate the wavelength regions in which the atmosphere will permit transmission of infrared radiation over a distance of several miles.

From Fig. 3, it is seen that the amount of total radiation for any one wavelength increases with temperature. It is also seen that the relative contribution of shorter wavelengths to the total thermal radiation increases at a much greater rate than that for the higher wavelengths. As an example, in comparing the area under the temperature curves of 0° C. and 100° C. in the near infrared up to 4 microns, it is seen that the area under the 100° C. curve is approximately 100 times greater than the area under the 0° C. curve. In comparing the area under the temperature curves of 0° C. and 100° C. in the medium range 8 to 12 microns, the area under the 100° C. curve is approximately only four times greater than the area under the 0° C. curve. Also, it is seen that between 8 and 10 microns approximately 10% less energy is radiated at 0° C. than between 10 to 12 microns. However, at 100° C. approximately 20% more energy is radiated between 8 to 10 microns than between 10 and 12 microns. It is the feature that the shorter wavelengths contribute a much greater increase in intensity with a rise in temperature than the longer wavelength that is utilized in my invention.

Figure 1:
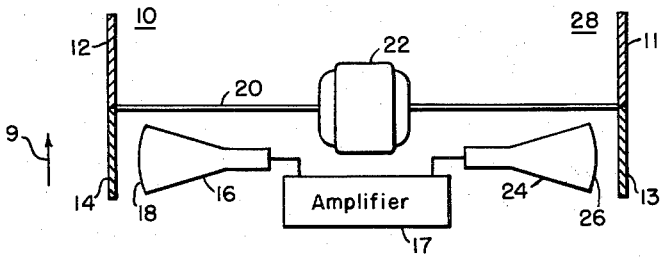
Figure 1 shows schematically a thermal image converting system incorporating my invention.

Referring to Fig. 1, there is illustrated schematically an apparatus for practicing my invention. This illustration has been made as simple as possible to illustrate the principles involved.

A thermal image pickup tube 16 is provided for the detection of a thermal image of an object 9. The pickup tube 16 may be of the type utilizing an electron beam or light beam scanning the thermal image screen 18 to secure a signal from each elemental area of the screen 18, such as described in the above-mentioned patent application.

The filter assembly 10 is interposed between the screen 18 and the object 9 and is revolved by a motor 22 at a predetermined rate.

The signal derived from the pickup tube 16 is connected through suitable electrical means 17 to a viewing tube 24 of the type which will produce a light image by means of a modulated electron beam such as a kinescope.

A color filter assembly disk 28 is interposed between the screen 26 of the viewing tube 24 and an observer or viewer 8. The color filter assembly 28 includes different selected color filter sections 11 and 13, such as red and blue respectively. The observer views the black and white images on the screen 26 of the pickup tube 24 through the filter sections 11 and 13 in sequence thereby imparting a two color contrasting picture to the image on the screen 26. The color filter assembly disk 28 is revolved by means of the motor 22.

The filter assemblies 10 and 28, which are mounted on the rotating shaft 20 of the motor 22, rotate at the same rate of speed.

In operation the radiation from object 9 is focused on the screen 18 of the pickup tube 16. The filter assembly 10 is revolved by the motor 22 at a predetermined rate causing the screen 18 of the pickup tube 16 to be sequentially subjected to images projected through sections 12 and 14 of the filter assembly 10. Sections 12 and 14 discriminate against various regions of the infrared spectrum in a different way. For instance, section 12 may pass all wavelengths up to 10 microns and absorb those beyond this value, while section 14 may transmit only wavelengths larger than 10 microns. This successive projection of different regions of the infrared onto the pickup tube 16 causes corresponding stored images or distributions of the physical parameter on which the mechanism of the pickup tube is based. For instance, the aforementioned photothermionic image converter will receive corresponding sets of temperature distributions on its sensitive surface. This temperature distribution affects a corresponding distribution in election excitation which can be probed by a scanning light spot. When the stored imaged is scanned point by point by suitable means, electrical signals corresponding to the intensity distribution of the stored image are produced. The switching rate between the two sections 12 and 14 of the filter assembly 10, is such that a field is scanned in one region of the infrared before switching to the other region of infrared.

The electrical signals representative of the two infrared regions are sequentially transmitted by the electrical means 17 to the viewing tube 24. The viewing tube 24 in response to the electrical signals from the pickup tube 16 produces sequentially black and white images on the screen 26 representative of the intensity of the two infrared regions detected sequentially by the pickup tube 16.

The color filter assembly 28 having sections 11 and 13 rotates at the same speed as the filter assembly 10 and provides for the sequential viewing of the black and white pictures on the screen 26 in different colors such as red and blue. The section 12 of the filter assembly 10 is aligned with the red color section 11 of the color assembly 28 so that when a black and white image is presented on the screen 26 representative of the radiation received by the pickup tube 16 after passing through section 12, a red image will be viewed by the observer 8. The section 14 of the filter assembly 10 is aligned with the blue color section 13 of the color filter assembly 28 in a similar manner so that the blue image viewed by the observer 8 is representative of the radiation image through the section 14. The observer 8 sees the image on the screen 26 through the sections 11 and 13 in sequence so that the colors are effectively added together.

If the thermal image of the object 9 observed on the viewing tube 24 is of uniform temperature the image viewed by the observer 8 is of uniform color, that is the blue will predominate with relatively little red color.

The uniform color image is obtained since the spectral distribution at a given temperature varies only a small amount for different surfaces. However, there will be contrasts in intensity of the image due to variation in emissivity of different objects in the image.

If the thermal image of the object 9 viewed on the viewing tube 24 contain an object of elevated temperature with respect to the surrounding region, the scene viewed by observer 8 will have a uniform color background but the heated object will appear in relief in a red color.

The elevated temperature of the object will increase the radiation energy at all wavelengths so that the intensity of both the blue and red color will be increased to the observer 8. However, since the radiation energy at the shorter wavelengths is much more increased than at the longer wavelength, the intensity of the red color will be increased by a much greater amount.

Figure 2:
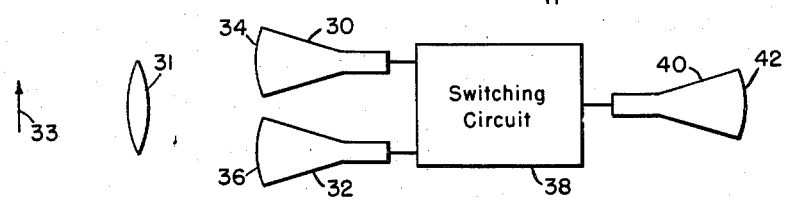
Fig. 2 shows schematically a modification of the thermal image converting system shown in Figure 1 incorporating my invention.

Another embodiment of my invention is illustrated in Fig. 2. In this device, a suitable optical system 31 is provided for focusing of the thermal image onto two pickup tubes 30 and 32. The pickup tubes 30 and 32 are similar in operation to the pickup tube described in Fig. 1. However, the pickup tube 30 has been made responsive to the lower wavelength of infrared region, for example up to 10 microns in wavelength, while the pickup tube 32 is made responsive to the upper wavelengths of the infrared region, for example upward from 10 microns in wavelength. This modification of Fig. 1 does not require a selective filter in front of the pickup tube. The response of the pickup tubes 30 and 32 may be made selective in wavelength by a variety of means such as the utilization of black materials in absorbing layer of the pickup tube screen 34 and 36 such that a certain region of the infrared is absorbed by one and reflected or transmitted by the other.

The output signals from the pickup tubes 30 and 32 are connected through suitable electrical means 38 to a suitable color television image tube 40. The color television image tube 40 is provided with a screen 42 having at least two different color phosphors for the direct color presentation of the color image to the viewer 41. This would eliminate the filter assembly interposed between the viewer and the viewing tube as shown in Fig. 1. There are many suitable color viewing tubes known in the art. The device shown in Fig. 2 would be adaptable to either sequential or simultaneous presentation of the thermal images detected by the pickup tubes 30 and 32.

Instead of separately representing the response to the various wavelength regions in the infrared, the difference in the signals received from two wavelength regions could be evaluated as a measure of temperature and then superimposed on the total radiation image.

While I have shown my invention in several forms it will be obvious to those skilled in the art that it is not so limited but is susceptible of various other changes and modification without departing from the scope thereof.

I claim as my invention:

1. A thermal image converter system comprising means for scanning a thermal image, a first filter means associated with said scanning apparatus for sequentially breaking down said thermal image into different wavelength regions whereby the signals developed in said scanning apparatus are representative of the temperature values of said image, a cathode ray tube adapted to reproduce images sequentially from said scanning apparatus, a second filter means associated with said cathode ray and means for rotating said first and second filter means.

2. A thermal image converter comprising a pickup tube, a rotatable filter means positioned in front of said pickup tube, electrical means for coupling the output of said pickup tube to a viewing tube, a second rotatable filter positioned in front of said viewing tube and mechanical means of rotating said first and second filter in synchronism.

3. A thermal image converter system comprising a first device sensitive to the lower wavelength region of infrared radiation, a second device sensitive to the upper wavelength region of infrared radiation, and means for producing color visible light representative of the signals obtained from said first and second devices.

4. A thermal image converter system comprising a pickup means for obtaining a first and second radiation image of an object, said first radiation image representative of a low wavelength band within the infrared region, said second radiation image representative of an upper wavelength band within the infrared region, and means for reproducing said first and second radiation images in different visible colors.

5. A thermal image converter for the presentation of a thermal image in two visible light colors comprising a radiation detection means for deriving a first and second radiation image, each of said first and second radiation images being representative of a different portion of radiation within the infrared region, and means for converting said first and second radiation images into different color visible light images.

6. A device for producing a color visible replica of an infrared radiation field comprising means for detecting said infrared radiation, means for obtaining a first and second electron excitation image in response to said radiation, said first electron excitation image being representative of the incidence of infrared radiation of a first band of wavelengths, said second electron excitation image being representative of the incidence of infrared radiation of a second band of wavelengths and means for reproducing said first and second electron excitation images in visible light of different colors.

7. A device for producing a color visible replica of an infrared radiation field comprising means for detecting said infrared radiations, means for obtaining a first and second electron excitation image in response to said radiation, said first electron excitation image being representative of infrared radiations within a low wavelength band, said second electron excitation image being representative of the incidence of infrared radiations of a high band of wavelengths and means for reproducing said first and second electron excitation images in different color visible light images.

8. A device for producing a color visible replica of an infrared radiation field comprising means for detecting said infrared radiations, means of obtaining a first and second electron excitation image in response to said radiation, said first electron excitation image being representative of the incidence of infrared radiations wherein a substantially large increase of infrared radiation is obtained with a rise in temperature within the infrared radiation field, said second electron excitation image being representative of the incidence of infrared radiations wherein a substantially smaller increase of infrared radiation is obtained with a rise in temperature within the infrared radiation field, means including a cathode ray tube for reproducing said first and second electron excitation images in visible light of different colors.

9. A device for producing a color visible replica of an infrared radiation field comprising means for detecting said infrared radiations, means for obtaining a first and second electron excitation image in response to said radiation, said first electron excitation image being representative of the incidence of infrared radiations substantially due to the emissivity of the objects within said radiation field and the temperature of the objects within said radiation field, said second electron excitation image being representative of the incidence of infrared radiation substantially indicative of the emissivity of the objects within said radiation field, means for reproducing said first and second electron excitation images in visible light of different colors so as to present an image indicative of the temperature of the objects within the radiation field by means of the contrasting colors.

10. A thermal image converter comprising a photothermionic pickup tube, a first rotatable filter having a plurality of sections of different spectral transmission response of said thermal image, said first rotatable filter being positioned between said pickup tube and said thermal image so as to sequentially vary the spectral transmission to said pickup tube, a viewing tube, electrical means connecting the output of said pickup tube to said viewing tube whereby the thermal image received by said pickup tube is converted into a light image, a second rotatable filter having the same number of sections as said first rotatable filter of different color transmission and positioned between said viewing tube and a viewer so as to sequentially vary the color of said light image, means for rotating said first and second filters in synchronism at a predetermined speed to permit field sequential conversion.

11. A thermal image converter comprising a pickup tube, a first movable filter means positioned in front of said pickup tube, means for supplying the output of said pickup tube to a viewing tube, a second movable filter positioned in front of said viewing tube and means for moving said first and second filter in synchronism.

References Cited in the file of this patent

UNITED STATES PATENTS

| | | |
|---|---|---|
| 2,121,771 | Jones | June 21, 1938 |
| 2,295,443 | Wilson | Sept. 8, 1942 |